United States Patent
Elliott (10) Patent No.: US 10,748,119 B2
(45) Date of Patent: Aug. 18, 2020

(54) SOCIAL NETWORK SEARCH (75) Inventor: Paul A. Elliott, Woodinville, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 502 days.

(21) Appl. No.: 12/697,977

(22) Filed: Feb. 1, 2010

(65) Prior Publication Data

US 2011/0191371 A1 Aug. 4, 2011

(51) Int. Cl.
G06F 16/29 (2019.01)
G06Q 10/10 (2012.01)
G06Q 50/00 (2012.01)

(52) U.S. Cl.
CPC .......... *G06Q 10/107* (2013.01); *G06Q 50/01* (2013.01)

(58) Field of Classification Search
CPC ......... G06F 17/30864; G06F 17/30867; G06F 17/30106; G06F 17/30525; G06Q 30/02; G06Q 50/01; H04L 63/102; H04L 51/32; H04L 63/104; H04L 67/306; G06N 3/006
USPC ................. 707/710, 733–734, 758; 705/319; 725/46
See application file for complete search history.

(56) References Cited

U.S. PATENT DOCUMENTS

| | | | |
|---|---|---|---|
| 6,549,768 B1 * | 4/2003 | Fraccaroli | H04W 4/029 455/456.3 |
| 7,499,965 B1 | 3/2009 | Chai | |
| 7,783,592 B2 * | 8/2010 | Armstrong et al. | 715/751 |
| 8,239,282 B2 * | 8/2012 | Tuflija | G06Q 20/10 705/26.41 |
| 8,731,526 B2 * | 5/2014 | Gibson et al. | 455/412.2 |
| 9,043,405 B2 * | 5/2015 | Ly | G06F 17/30864 709/206 |
| 9,336,333 B2 * | 5/2016 | Blue | G06F 17/30864 |
| 2002/0032735 A1 | 3/2002 | Burnstein et al. | |
| 2004/0002348 A1 * | 1/2004 | Fraccaroli | H04W 4/029 455/456.3 |
| 2005/0086211 A1 * | 4/2005 | Mayer | G06F 17/30864 |
| 2005/0131894 A1 * | 6/2005 | Vuong | 707/5 |
| 2005/0181803 A1 * | 8/2005 | Weaver | H04W 4/029 455/456.1 |
| 2005/0256866 A1 * | 11/2005 | Lu | G06F 17/30867 |
| 2005/0267766 A1 | 12/2005 | Galbreath et al. | |

(Continued)

FOREIGN PATENT DOCUMENTS

| CN | 101110083 A | 1/2008 |
|---|---|---|
| CN | 101282337 | 10/2008 |
| WO | WO-2011094036 | 8/2011 |

OTHER PUBLICATIONS

"Do You Have Questions? We've Got Answers!", Retrieved from: <http://www.footballsocialnetwork.com/static/faq/faq.do> on Jan. 21, 2010, Football Social Network,9 pages.

(Continued)

*Primary Examiner* — Alex Gofman
*Assistant Examiner* — Linh Black (57) ABSTRACT

Social network search techniques are described. In an implementation, one or more search criteria are stored that are usable to search for users of a social network service. Responsive to a new user joining the social network service, a search of data associated with the new user is performed using the stored one or more search criteria to determine whether the one or more search criteria are met by the new user.

15 Claims, 4 Drawing Sheets (56) References Cited

U.S. PATENT DOCUMENTS

| | | | |
|---|---|---|---|
| 2006/0048059 A1* | 3/2006 | Etkin | 715/745 |
| 2006/0112081 A1 | 5/2006 | Qureshi | |
| 2006/0265277 A1* | 11/2006 | Yasinovsky | A63F 13/12 463/42 |
| 2007/0030824 A1* | 2/2007 | Ribaudo et al. | 370/328 |
| 2007/0033191 A1* | 2/2007 | Hornkvist | G06F 16/90335 |
| 2007/0070038 A1* | 3/2007 | Hoffberg | G06F 3/0482 345/156 |
| 2007/0156636 A1* | 7/2007 | Norton | G06F 17/30997 |
| 2007/0179792 A1* | 8/2007 | Kramer | 705/1 |
| 2008/0005064 A1* | 1/2008 | Sarukkai | G06F 17/241 |
| 2008/0071769 A1 | 3/2008 | Jagannathan | |
| 2008/0086431 A1* | 4/2008 | Robinson et al. | 706/11 |
| 2008/0094048 A1 | 4/2008 | Wallace et al. | |
| 2008/0114834 A1* | 5/2008 | Miyazaki | G06F 17/30209 709/204 |
| 2008/0140650 A1* | 6/2008 | Stackpole | 707/5 |
| 2008/0215623 A1 | 9/2008 | Ramer et al. | |
| 2008/0222308 A1 | 9/2008 | Abhyanker | |
| 2008/0228887 A1 | 9/2008 | Robertson | |
| 2008/0288277 A1* | 11/2008 | Fasciano | 705/1 |
| 2008/0306826 A1* | 12/2008 | Kramer et al. | 705/14 |
| 2008/0306954 A1* | 12/2008 | Hornqvist | G06F 21/6218 |
| 2009/0082038 A1* | 3/2009 | McKiou et al. | 455/456.6 |
| 2009/0150346 A1 | 6/2009 | Soderstrom | |
| 2009/0271212 A1* | 10/2009 | Savjani et al. | 705/1 |
| 2009/0271244 A1 | 10/2009 | Kalasapur et al. | |
| 2009/0271374 A1 | 10/2009 | Korn et al. | |
| 2010/0030734 A1* | 2/2010 | Chunilal | G06Q 10/00 707/770 |
| 2010/0169376 A1* | 7/2010 | Chu | 707/780 |
| 2010/0250424 A1* | 9/2010 | Torres | G06Q 40/04 705/37 |
| 2010/0325218 A1* | 12/2010 | Castro | G06Q 10/10 709/206 |
| 2011/0004561 A1* | 1/2011 | Shahine et al. | 705/319 |
| 2011/0130155 A1* | 6/2011 | Brown | G06Q 10/10 455/456.2 |
| 2011/0131085 A1* | 6/2011 | Wey | 705/14.16 |

OTHER PUBLICATIONS

Gombossy, George "Linkedin: Great Tips on How to Increase Benefit of Best Social Network Site to Find a Job", Retrieved from: <http://ctwatchdog.com/2009/08/24/linkedin-great-tips-on-how-to-increase-benefit-of-best-social-network-site-to-find-a-job> on Jan. 21, 2010, (Aug. 5, 2009),9 pages.

Hoff, Todd "Notify.Me Architecture—Synchronicity Kills", *High Scalability*, Available at <http://highscalability.com/notify-me-architecture-synchronicity-kills>,(Oct. 27, 2008), 15 pages.

Kozak, Esteban "Announcing LinkedIn's New Search Platform", Retrieved from: <http://blog.linkedin.com/2008/11/24/announcing-linkedins-new-search-platform/> on Jan. 21, 2010, (Nov. 24, 2008),9 pages.

"PCT Search Report and Written Opinion", Application No. PCT/US2011/020209, (dated Sep. 7, 2011), 9 pages.

"Sixth Office Action Issued in Chinese Patent Application No. 201180007984.0", dated May 14, 2019, 3 Pages. (W/O English Translation).

"Foreign Office Action", CN Application No. 201180007984.0, dated Oct. 8, 2014, 16 pages.

"Extended European Search Report", EP Application No. 11737424.9, dated Mar. 17, 2015, 6 pages.

The State Intellectual Property Office of China, Second Office Action issued in Chinese Patent Application No. 201180007984.0, dated Oct. 23, 2015, China, 11 pages.

European Patent Office, Office Action issued in European Patent Application No. 11737424.9, dated Nov. 18, 2015, Germany, 7 pages.

The State Intellectual Property Office of China, Third Office Action issued in Chinese Patent Application No. 201180007984.0, dated May 5, 2016, China, 8 pages.

State Intellectual Property Office of the People's Republic of China, Fourth Office Action Issued in Chinese Patent Application No. 201180007984.0, dated Sep. 30, 2016, 10 Pages.

"Fifth Office Action and Search Report Issued in Chinese Patent Application No. 201180007984.0", dated Oct. 15, 2018, 14 Pages.

"Office Action Issued in Chinese Patent Application No. 201180007984.0", dated Apr. 27, 2017, 09 Pages.

\* cited by examiner

SOCIAL NETWORK SEARCH

Social network services continue to increase in popularity. For example, users may leverage a social network service to find and interact with other users, such as friends, business contacts, and so on. This interaction may be performed in a variety of ways, such as through messaging, photo sharing, posting videos, and so on.

To interact with users of a social network service, users are typically added as "friends," which works as a type of permission system to regulate which users may access content and data of other users. To locate friends, a user may enter search criteria, which is then used to search through current users of the social network service. In this way, a user can perform a variety of different search to locate other users, such as high school friends, coworkers, and so on. However, these searches are typically performed "one time only" and therefore may be forgotten about by a user that initiated the search. These traditional techniques also required that the user reenter the search to perform the search at a later time.

SUMMARY

Social network search techniques are described. In an implementation, one or more search criteria are stored that are usable to search for users of a social network service. Responsive to a new user joining the social network service, a search of data associated with the new user is performed using the stored one or more search criteria to determine whether the one or more search criteria are met by the new user.

In an implementation, a determination is made as to whether one or more search criteria that are provided by a first user are met by a second user of a social network service. Responsive to the determination that the one or more search criteria are met by the second user, an option is provided to the second user to notify the first user of the determination.

In an implementation, one or more computer-readable media comprise instructions stored thereon that, responsive to execution on a computing device, causes the computing device to cause a first search to be performed for one or more users of a social network service that correspond to one or more search criteria, cause the one or more search criteria to be stored, and cause a second search to be performed using the stored one or more search criteria. The second search is caused to be performed subsequent to the first search and automatically and without user invention in response to at least one other user being added to the social network service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditional social network service provide searching functions to allow users to search for old friends, coworkers, and so on by name and other attributes (e.g., School, University, Company etc.) to determine if these people are current users of the social network service. However, if they are not yet members, the search is over and the user has to try again later to see if the user has subsequently joined the service. Therefore, the user may forget about this search and will not know when that searched for person has joined the service until the search is manually initiated again by the user, possibly missing new connections as a result and therefore decreasing the overall utility of the service.

Social network search techniques are described. In an implementation, an option is given to save a search for other users of a social network service. Therefore, if a search does not return satisfactory results, the user will be given the option to save the search, e.g., in a "Friend Finder Wish List." Subsequent searches may be performed automatically as new users join the service, thereby updating the search results automatically and without further user intervention. The user may then be notified if and when a matching user does join the service, thereby doing the work on their behalf and connecting people as soon they join the service. In an implementation, a user that has been "found" is given an option to notify the other user upon joining the service. A variety of other examples are also contemplated, further discussion of which may be found in relation to the following sections.

In the following discussion, an example environment is first described that is operable to perform social network reward techniques. Example procedures are then described which may be employed by the example environment. However, it should be readily apparent that the example environment is not limited to performing the example techniques and the example techniques are not limited to performance in the example environment.

Example Environment

Figure 1:
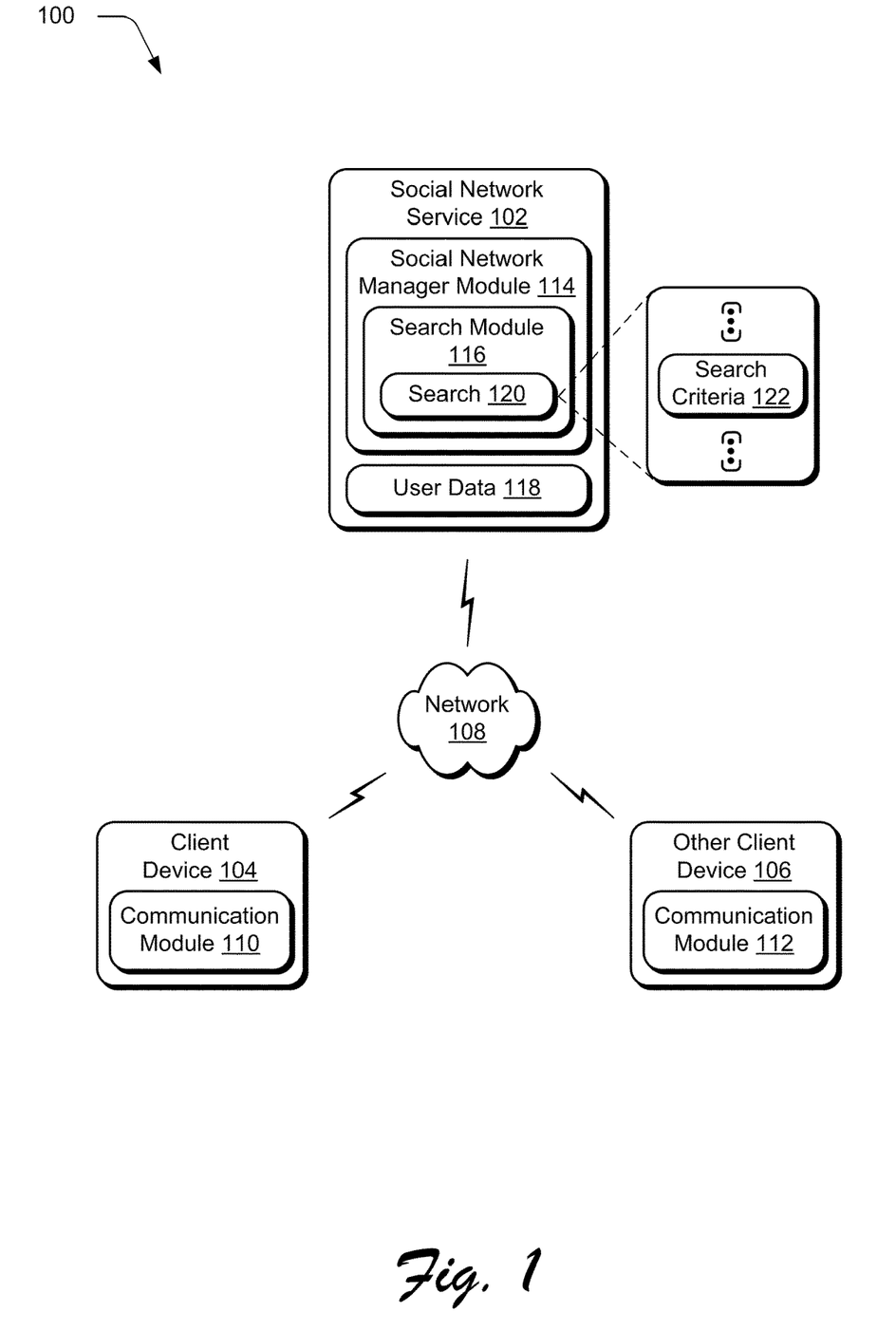
FIG. 1 is an illustration of an environment in an example implementation that is operable to perform social network search techniques.

FIG. 1 is an illustration of an environment 100 in an example implementation that is operable to employ social network search techniques. The illustrated environment 100 includes a social network service 102, a client device 104, and another client device 106, each of which are communicatively coupled, one to another, over a network 108.

The client devices 104, 106 may be configured in a variety of ways. For example, the client devices 104, 106 may be configured as a computer that is capable of communicating over the network 108, such as a desktop computer, a mobile station, an entertainment appliance, a set-top box communicatively coupled to a display device, a wireless phone, a game console, and so forth. Thus, the client devices 104, 106 may range from full resource devices with substantial memory and processor resources (e.g., personal computers, game consoles) to a low-resource device with limited memory and/or processing resources (e.g., traditional set-top boxes, hand-held game consoles). The client devices 104, 106 may also relate to an entity that operates the client devices 104, 106. In other words, client devices 104, 106 may describe logical clients that include software in the following discussion.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks. For instance, the social network service 102 and the client devices 104, 106 may be communicatively coupled via the Internet. Additionally, both the client devices 104, 106 may be communicatively coupled via a local wireless network. A wide variety of other instances are also contemplated.

The client devices 104, 106 are each illustrated as including a respective communication module 110, 112. The communication modules 110, 112 are representative of functionality of the respective client devices 104, 106 to communicate via the network 108. For example, the communication modules 110, 112 may include browser functionality to interact with the social network service 102 via network 108.

The social network service 102 may support a variety of different functionality which is represented by the social network manager module 114. Through the social network manager module 114, for instance, the social network service 102 may support communication of status updates between the client devices 104, 106 that have been specified as friends of each other. Additionally, the specified "friendship" of the social network service 102 may be used as a basis to permit sharing of photos, video, blogs, and so on. Thus, the social network service 102 may use the friend relationship as a permission technique to permit or restrict access to content associated with a user's account of the social network service 102.

For instance, the client device 102 may be associated with a user's account of the social network service 102. Through this user account, the client device 104 may be used to specify a friend, such as a user account of the social network service 102 that is accessible via the other client device 106. By doing this, the other client device 106 is permitted to access content associated the client device 104, such as content associated with an account of the social network service 102 of a user of the client device 104 that provided credentials to access the user account. Although a permission technique regarding friends have been described, it should be readily apparent that the social network service 102 may be configured in a variety of ways to support communication between users, such as by communicating status updates to subscribers of a particular user's network feed.

The social network service 102, and more particularly the social network manager module 116, is also illustrated as including a search module 116 that is representative of functionality regarding search. In a first implementation, the search module 116 may be representative of functionality of the social network service 102 to search for users of the social network service 102. For example, the search module 116 may be configured to search user data 118 that describes users of the social network service 102.

This user data 118 may describe a variety of different attributes of the users, such as education, interests, age, physical characteristics, and so on. For instance, these attributes may be entered by a user to be a part of the user's profile for the social network service 102. Additionally, the user data 118 may also include data that was imported into the social network service 102, such as from another social network service, contacts from email accounts, and so on.

The search module 116 is illustrated as including a search 120 having one or more search criteria 122. For example, the search criteria 122 may specify different conditions for the user data 118, such as a particular school, age range, and so on such that a user of the client device 104 may locate a user of the other client device 106. The search module 116 may then perform the search 120 by comparing the search criteria 122 with the user data 118 to find a "match," e.g., attributes in the user data 118 that correspond with the search criteria 122.

The search module 116 may also be configured to store the search 120 to be performed again later. For example, the search 120 may be saved in a user interface and performed through selection of a representation of the search. In this way, the search 116 may be performed again without reentering the search criteria 122.

In another example, the search 120 may be stored by the search module 116 (e.g., in a central repository) to be performed again automatically and without further user intervention. For instance, the search 120 may be performed at predetermined intervals of times, e.g., every day, once per week, and so on. In another instance, the search 120 may be performed in response to a change in the user data 118, such as when profile information of a user is changed, when a new user joins the social network service 102, and so on. Thus, the search 120, when saved, may be used to find users after the initial search was performed. The saved search 120 may be managed and represented in a user interface of the social network service 102 in a variety of ways, further discussion of which may be found in relation to the following figure.

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. In the case of a software implementation, the module or functionality represents program code that performs specified tasks when executed on a processor (e.g., CPU or CPUs). The program code can be stored in one or more computer readable memory devices, e.g., memory or other tangible media. The features of the personification techniques described below are platform-independent, meaning that the techniques may be implemented on a variety of commercial computing platforms having a variety of processors.

Figure 2:
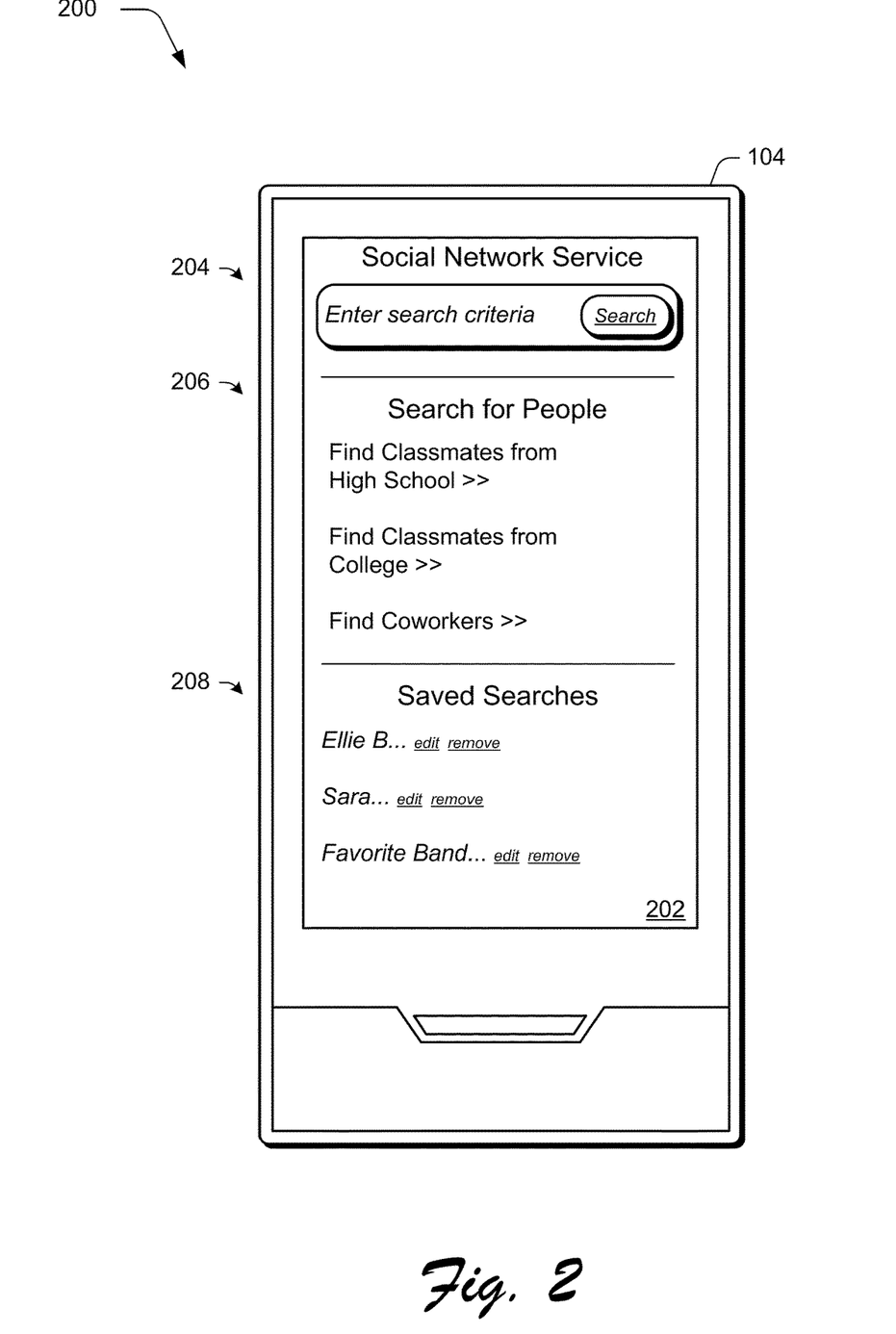
FIG. 2 is an illustration showing an example implementation in which a user interface is output by a client device of FIG. 1 that includes representations of saved searches.

FIG. 2 is an illustration showing an example implementation 200 in which a user interface 202 is output by the client device 104 of FIG. 1 to interact with the social network service 102 and that includes representations of saved searches. This user interface 202 is configured to search for other users (e.g., a user of the other client device 106) of the social network service 102.

For example, the user interface 202 includes a portion 204 via which a user may enter one or more of the search criteria 122 for the search 120 of user data 118. The user interface 202 also includes a portion 206 having suggested searches, examples of which include "Find Classmates from High School," "Find Classmates from College," and "Find Coworkers." Selection of the suggested searches causes initiation of the represented search, which in this instance is based at least in part on data of the user. For instance, the "Find Classmates from High School" may leverage information entered for the user's own profile to find other users with similar information. Other instances are also contemplated, such as suggested searches that are preconfigured by the social network service 102 but are not based on the user's profile information.

The user interface 202 also includes a portion 208 that details saved searches. In this example, the searches are represented using names of a particular user that is to be searched. In an implementation, this name is provided by a user of the client device 104 to represent other search criteria 122 of the represented search 120. Other implementations are also contemplated, such as inclusion of one or more of the search criteria 122 itself to provide the representation of the search 120. Each of the represented searches that are illustrated in the portion 208 also includes options that are selectable to edit search criteria (represented as "edit" in the user interface 202) and remove the corresponding search, which is represented as "remove" in the user interface 202. The saved searches may then be leveraged to provide a variety of functionality related to search, further discussion of which may be found in relation to the following procedures.

Example Procedures

The following discussion describes search techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the example embodiment 200 of FIG. 2.

Figure 3:
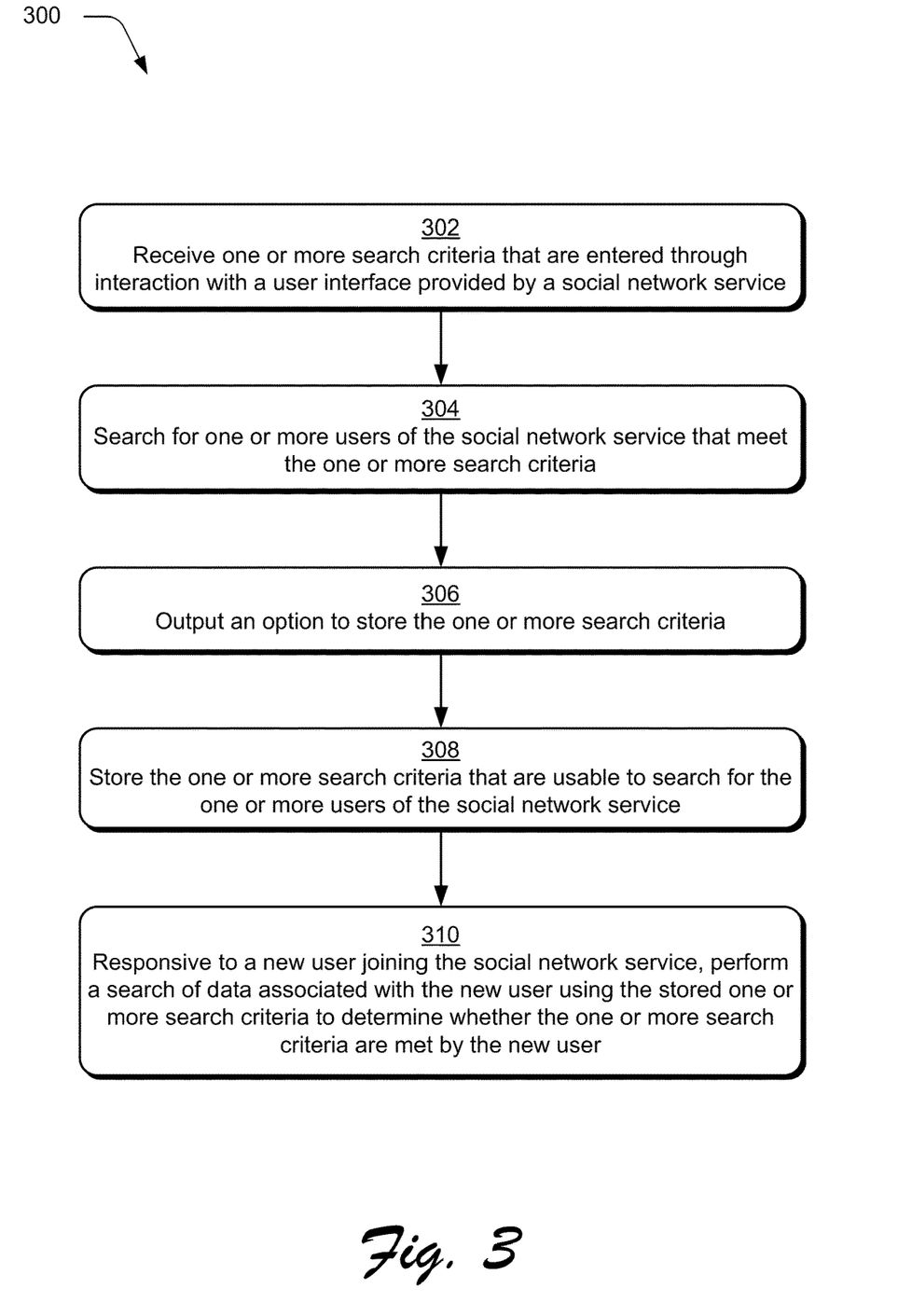
FIG. 3 is a flow diagram depicting a procedure in an example implementation in which one or more search criteria are saved to perform a search of a social network service.

FIG. 3 depicts a procedure 300 in an example implementation in which one or more search criteria are saved to perform a search of a social network service. One or more search criteria are received that are entered through interaction with a user interface provided by a social network service (block 302). For example, a user of the client device 104 may use browser functionality of the communication module 110 to interact with the search module 116 over the network 108, e.g., using a web page. Through interaction with the search module 116, the user may specify the search criteria 122 that are to be used to perform the search 120, such as attributes of a user that is to match the search 120.

A search is performed for one or more users of the social network service that meet the one or more search criteria (block 304). The search module 116, for instance, may compare the search criteria 122 of the search 120 with user data 118. The user data 118 may describe the current users of the social network service 102, such as by using the attributes previously described in a profile of the user. A list of one or more users that match the search criteria 122 may then be communicated back to the user of the client device 104, an option may be provided to restrict the notification (an example of which may be found in relation to FIG. 4), and so on. Likewise, if no users have been found that match the search criteria 122, a message stating such may also be communicated back to the client device 104 via the network 108.

An option is output to store the one or more search criteria (block 306). The one or more search criteria are then stored that are usable to search for the one or more users of the social network service (block 308). For example, the option may be output for communication over the network 108 to the client device 104 regardless of whether one or more users of the social network service 102 have been found that match the search criteria 122. This search criteria 122 may be stored in a variety of ways, such as local to one or more servers of the social network service 102, in a central list of saved searches by a third party site, and so on.

Responsive to a new user joining the social network service, a search is performed of data that is associated with the new user using the stored one or more search criteria to determine whether the one or more search criteria are met by the new user (block 310). For example, the search module 116 may receive an indication that the user data 118 has been added to by adding a new user to the social network service 102. This new data may then be examined by the search module 116 to determine if the new data corresponds to the search criteria 122, e.g., "matches" the criteria, and therefore the new user meets the search criteria 122. Although a "match" has been described it should be readily apparent that "one-to-one" correspondence is not necessary in an implementation. A variety of other examples are also contemplated, such as to perform the search described above responsive to other changes in the user data 118 (e.g., a user changes data in a profile).

Figure 4:
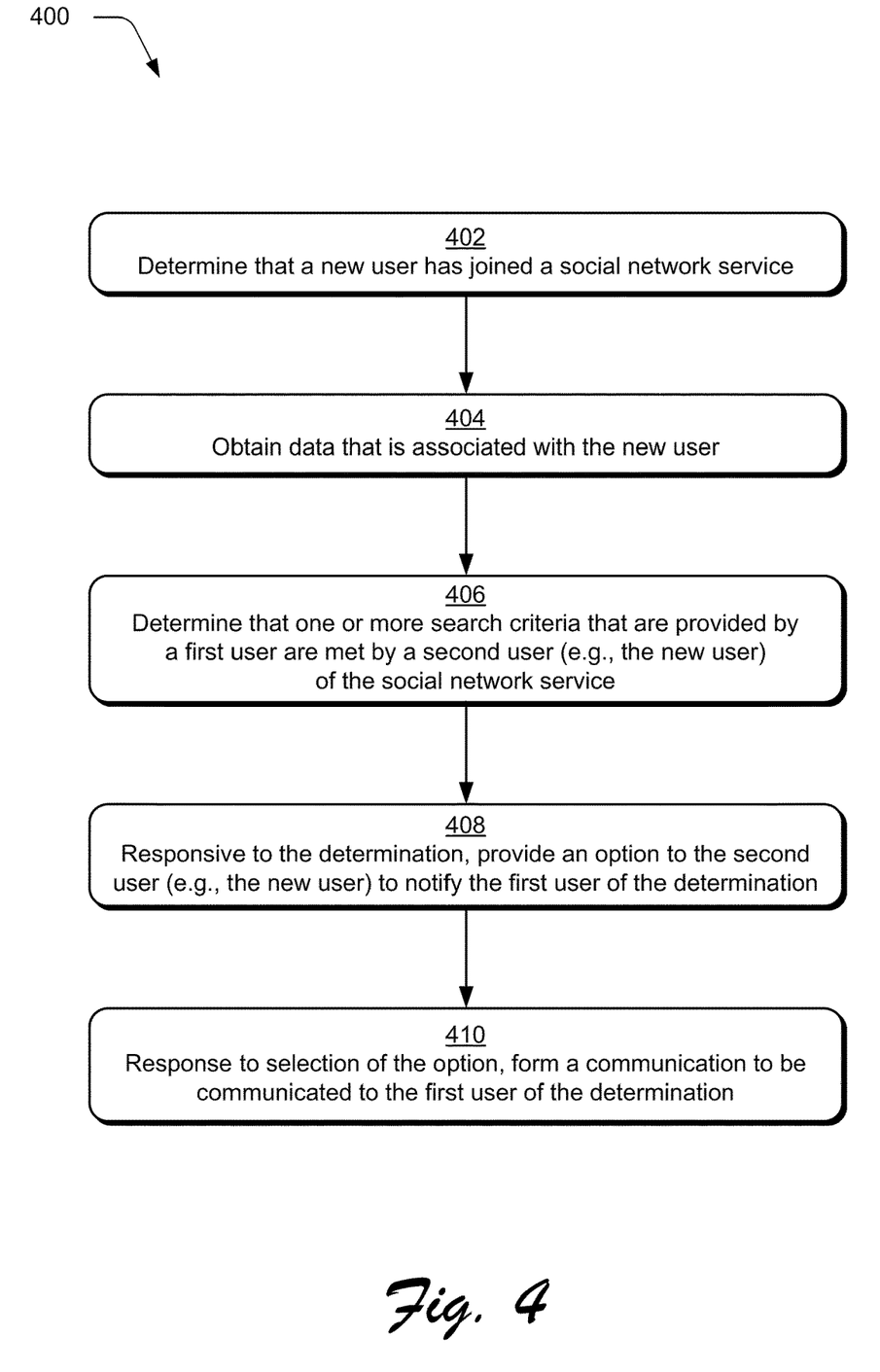
FIG. 4 is a flow diagram depicting a procedure in an example implementation in which an option is output to permit notification that search criteria have been met by a user.

FIG. 4 depicts a procedure 400 in an example implementation in which an option is output to permit notification that search criteria have been met by a user. A determination is made that a new user has joined a social network service (block 402). As previously described, this determination may be performed in a variety of ways, such as by detecting a change to the user data 118, receipt of a notification of formation of a new user account, and so on.

Data is obtained that is associated with the new user (block 404). For example, the data may be entered by the user in conjunction with setting up a user account (e.g., a profile), may be obtained from third-party sources (e.g., an email provider to the user), and so on.

A determination is made that one or more search criteria that are provided by a first user are met by a second user of the social network service (e.g., the new user) (block 406). As previously described, the search criteria 122 of the search may be compared with the obtained user data to determine whether it corresponds, e.g., "matches," the search criteria 122.

Responsive to the determination, an option is provided to the second user (e.g., the new user) to notify the first user of the determination (block 408). For example, the second user that is the subject of the search may be provided with the option to notify the first user that initiated the search that the second user "has been found." In this way, the second user may be given a degree of control of who finds them. Additionally, the option may include profile data of the first user that may serve as a basis for the decision of whether to select the option. In an implementation, this profile data may contain additional information over that which is generally available to other users of the social network service 102. This may be permitted because the first user wishes to locate the second user that matches the search criteria 122 and thus may have an expanded degree of comfort in sharing this expanded information. Further, this additional information may encourage the second user to permit the notification due to the level of trust exhibited by the expanded profile information.

Responsive to selection of the option, a communication is formed to be communicated to the first user of the determination (block 410). For example, the communication may be configured to confirm by the first user that the second user is the intended result of the search. If so, the confirmation may then serve to add/invite the second user as a friend of the first user. Thus, the communication may serve as a mechanism to reduce contact by malicious parties and retain control over who are "friends" of the user. A variety of other examples are also contemplated.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
   receiving one or more search criteria entered by a user, by the at least one computing device, and usable to perform a search for information associated with a social network service based on the one or more search criteria,
   wherein information associated with the social network service corresponds to content and data associated with one or more other users of the social network service, the social network service enabling the user to interact with the one or more other users by adding the one or more other users of the social network service that meet the one or more search criteria as friends as a type of permission system to permit or restrict access to content and data of the user by the one or more other users;
   causing performance of the search by the at least one computing device at a first time;
   determining by the at least one computing device that the performed search did not return results of information associated with the social network service that meet the one or more search criteria entered by the user;
   responsive to the determination, automatically causing storage by the at least one computing device of the one or more search criteria entered by the user;
   at a second time subsequent to the first time and without further intervention by the user, causing the search for information associated with the social network service based on the one or more search criteria to determine whether the one or more search criteria are met by information of the one or more other users associated with the social network service;
   responsive to a determination that the one or more search criteria are met by the information of the one or more other users of the social network service, providing an option to the one or more other users to notify the user who entered the one or more search criteria that the one or more other users match the one or more search criteria, without displaying the one or more other users in search results to the user that provided the search criteria,
   wherein the option includes profile information of the user that provided the one or more search criteria that is viewable by the one or more other users that met the search criteria,
   wherein the profile information includes at least one item of information that is not generally accessible by the one or more other users of the social network service that have not been specified as associated with the user,
   wherein the user that provided the one or more search criteria is not notified that the one or more other users match the search criteria when the option to notify the user that provided the one or more search criteria is not selected,
   responsive to receipt of a selection of the option to notify the user, forming a communication to be communicated to the user that the information of the one or more users matched the one or more search criteria, the communication including an option for the user to confirm inviting or adding the one or more users to the friends of the user; and
   in response to receiving confirmation of the one or more users by the user, inviting or adding the one or more users to become friends of the user.

2. The method of claim 1, wherein the one or more search criteria are received through user interaction with a user interface.

3. The method of claim 2, wherein the search is performed using information that is associated with users that have joined the social network service before receipt of the one or more search criteria.

4. The method of claim 2, wherein the search is performed responsive to receipt of the one or more search criteria entered through user interaction with the user interface.

5. The method of claim 2, wherein the user interface is provided via a browser.

6. A method implemented by at least one computing device, the method comprising:
   receiving, by the at least one computing device and at a first time, one or more search criteria entered by a first user and usable to perform a search for information associated with a social network service based on the one or more search criteria,
   wherein information associated with the social network service corresponds to content and data associated with one or more other users of the social network service, the social network service enabling the first user to interact with the one or more other users by adding the one or more other users of the social network service that meet the one or more search criteria as friends as a type of permission system to permit or restrict access to content and data of the first user by the one or more other users;
   causing performance of the search at the first time and by the at least one computing device;
   determining, by the at least one computing device and at the first time, that the performed search did not return results of information associated with a social network service that meet the one or more search criteria entered by the first user;
   responsive to the determination and at the first time, automatically causing storage by the at least one computing device of the one or more search criteria entered by the first user;
   at a second time subsequent to the first time and without further intervention by the first user, causing the search for information associated with the social network service to be performed at a second time subsequent to the first time, using the stored one or more search criteria; and
   determining, by the at least one computing device and responsive to a subsequent search using the stored search criteria performed automatically, that the one or more stored search criteria return results of information of the one or more other users associated with a social network service that meet the one or more search criteria;

responsive to a determination that the one or more search criteria are met by the information of the one or more other users of the social network service, providing an option to the one or more other users to notify the first user that the one or more other users match the one or more search criteria, without displaying the one or more other users in search results to the user that provided the search criteria, wherein the option includes profile information of the user that provided the one or more search criteria that is viewable by the one or more other users that met the search criteria, wherein the profile information includes at least one item of information that is not generally accessible by the one or more other users of the social network service that have not been specified as associated with the first user, wherein the first user that provided the one or more search criteria is not notified that the one or more other users match the search criteria when the option to notify the first user that provided the one or more search criteria is not selected, responsive to receipt of a selection of the option to notify the first user, forming a communication to be communicated to the first user that the information of the one or more users matched the one or more search criteria, the communication including an option for the first user to confirm inviting or adding the one or more users to the friends of the first user; and in response to receiving confirmation of the one or more users by the first user, inviting or adding the one or more users to become friends of the first user.

7. A method implemented by at least one computing device, the method comprising:

receiving one or more search criteria entered by a user, by the at least one computing device, and usable to perform a search for information associated with a social network service based on the one or more search criteria, wherein information associated with the social network service corresponds to content and data associated with one or more other users of the social network service, the social network service enabling the user to interact with the one or more other users by adding the one or more other users of the social network service that meet the one or more search criteria as friends as a type of permission system to permit or restrict access to content and data of the user by the one or more other users;

causing performance of the search by the at least one computing device at a first time;

determining by the at least one computing device that the performed search did not return results of information associated with the social network service that meet the one or more search criteria entered by the user;

responsive to the determination, automatically causing storage by the at least one computing device of the one or more search criteria entered by the user;

at a second time subsequent to the first time and without further intervention by the user, causing the search for information associated with the social network service based on the one or more search criteria to determine whether the one or more search criteria are met by information of the one or more other users associated with the social network service;

responsive to a determination that the one or more search criteria are met by the information of the one or more other users of the social network service, providing to said one or more users profile information of the user that provided the one or more search criteria, wherein the profile information includes at least one item of information that is not generally accessible by the one or more other users of the social network service that have not been specified as associated with the user;

responsive to the profile information, said one or more users has an option to notify the user who entered the one or more search criteria that said one or more users met the search criteria;

responsive to receipt of a selection of the option to notify the user, the computing device displays said one or more users in the search results of the user who entered the one or more search criteria, forming a communication with an option for the user to confirm inviting or adding the one or more users to the friends of the user; and responsive to receipt of a selection of an option to not notify the user, the computing device omits said one or more users in the search results of the user who entered the one or more search criteria.

8. The method of claim 6, wherein the one or more search criteria are received through user interaction with a user interface.

9. The method of claim 8, wherein the search is performed responsive to receipt of the one or more search criteria entered through user interaction with the user interface.

10. The method of claim 8, wherein the user interface is provided via a browser.

11. The method of claim 6, wherein the search is performed using information that is associated with users that have joined the social network service before receipt of the one or more search criteria.

12. The method of claim 7, wherein the one or more search criteria are received through user interaction with a user interface.

13. The method of claim 12, wherein the search is performed responsive to receipt of the one or more search criteria entered through user interaction with the user interface.

14. The method of claim 12, wherein the user interface is provided via a browser.

15. The method of claim 7, wherein the search is performed using information that is associated with users that have joined the social network service before receipt of the one or more search criteria.

* * * * *